United States Patent
Shibata et al.

(10) Patent No.: US 7,074,513 B2
(45) Date of Patent: Jul. 11, 2006

(54) UNIT CELL FOR SOLID ELECTROLYTE TYPE FUEL CELL AND RELATED MANUFACTURING METHOD

(75) Inventors: Itaru Shibata, Kanagawa-ken (JP); Masaharu Hatano, Kanagawa-ken (JP); Tatsuhiro Fukuzawa, Kanagawa-ken (JP); Naoki Hara, Kanagawa-ken (JP); Dong Song, Kanagawa-ken (JP); Yoshiko Hishitani, Kanagawa-ken (JP); Fuminori Satou, Kanagawa-ken (JP); Keiko Kushibiki, Kanagawa-ken (JP); Makoto Uchiyama, Kanagawa-ken (JP); Mitsugu Yamanaka, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 569 days.

(21) Appl. No.: 10/302,856

(22) Filed: Nov. 25, 2002

(65) Prior Publication Data

US 2003/0104268 A1    Jun. 5, 2003

(30) Foreign Application Priority Data

Nov. 30, 2001    (JP)    ............ P 2001-367384

(51) Int. Cl.
*H01M 8/04* (2006.01)
*H01M 8/12* (2006.01)
*H01M 4/86* (2006.01)

(52) U.S. Cl. ............ 429/38; 429/39; 429/44

(58) Field of Classification Search ........ None
See application file for complete search history.

(56) References Cited

U.S. PATENT DOCUMENTS

| 5,460,896 | A | * | 10/1995 | Takada et al. ............ 429/33 |
| 5,798,188 | A | * | 8/1998 | Mukohyama et al. ........ 429/34 |
| 6,291,094 | B1 | * | 9/2001 | Yoshimura et al. .......... 429/34 |
| 6,852,438 | B1 | * | 2/2005 | Gao et al. .................... 429/34 |

FOREIGN PATENT DOCUMENTS

| JP | 63-103033 | 7/1988 |
| JP | 4-92369 | 3/1992 |
| JP | 7-45297 | 2/1995 |
| JP | 9-50812 | 2/1997 |
| JP | 2000-200614 | 7/2000 |

* cited by examiner

OTHER PUBLICATIONS

G. Schiller et al., "Plasma Sprayed Thin-Film SOFC for Reduced Operating Temperature", pp. 595-600, Fuel Cells Bulletin, 2000.

*Primary Examiner*—Michael Barr
*Assistant Examiner*—Karie O'Neill
(74) *Attorney, Agent, or Firm*—McDermott Will & Emery LLP (57) ABSTRACT

A unit cell for a solid electrolyte type fuel cell is provided with a fuel electrode, an air electrode making a pair with the fuel electrode, a solid electrolyte interposed between the fuel electrode and the air electrode, a porous metallic base body disposed on at lease one of a surface of the fuel electrode on the far side from the solid electrolyte and a surface of the air electrode on the far side from the solid electrolyte such that the fuel electrode, the electrolyte, and a plurality of concave portions formed in the porous metallic base body so as to extend, in a laminating direction in which the fuel electrode, the electrolyte, the air electrode and the porous metallic base body are laminated, from a surface of the porous metallic base body.

12 Claims, 7 Drawing Sheets

UNIT CELL FOR SOLID ELECTROLYTE TYPE FUEL CELL AND RELATED MANUFACTURING METHOD

BACKGROUND OF THE INVENTION

The present invention relates to a unit cell for a solid electrolyte type fuel cell, which employs a solid electrolyte to induce electrochemical reaction so as to produce electrical energy, and its related manufacturing method and, more particularly, a unit cell for a solid electrolyte type fuel cell, having a solid electrolyte sandwiched between a pair of electrodes, and its related manufacturing method.

In recent years, attempts have heretofore been made to provide a solid electrolyte type fuel cell (solid oxide electrolyte type fuel cell: hereinafter preferably referred to as "SOFC") through the use of an electric power generator element with a structure in which a solid oxide electrolyte medium is sandwiched between two electrodes, i.e., a fuel electrode (anode) and an air electrode (cathode) which are supplied with hydrocarbon fuel, such as methane, and oxidizing gas such as oxygen or air, respectively, to produce an electric power output. The SOFC has a high electric power generating efficiency and a exhaust heat recovering capability and is expected as a third-generation fuel cell.

Japanese Patent Application Laid-Open Publication No. H9-50812 discloses a structure which includes a porous electrode substrate composed of a sintered body of ceramic electrode material powder with a porosity rate varying in a direction of a thickness.

Japanese Patent Application Laid-Open Publication No. 2000-200614 discloses a structure which includes a porous electrode substrate composed of a sintered body of ceramic electrode material powder.

It has been proposed to provide a so-called DLR cell (Plasma Sprayed Thin-Film SOFC for Reduced Operating Temperature, Fuel Cells Bulletin, pp. 597 to 600, 2000).

Japanese Patent Application Laid-Open Publication No. H7-45297 and Japanese Utility Model Application Laid-Open Publication No. S63-106063 disclose a SOFC which includes a current collector, made of Nickel felt, in addition to electrodes, for collecting power output generated with a fuel electrode and an air electrode. With such a SOFC, a large number of cell elements are connected in series or in parallel in use and a joint member (hereinafter referred to as "I.C." (interconnector)) is required to electrically connect the cell elements with respect to one another. There are some instances where such an I.C. has a current collecting function.

Further, owing to the SOFC adapted to generate electric power output through the use of the fuel electrode and the air electrode that need hydrocarbon fuel gas, such as methane, and oxidizing gas such as oxygen and air, it is required to use a member which forms gas flow passages to introduce gases to respective surfaces of the electrodes. There are some instances where such gas flow passages have the I.C. functions, respectively.

SUMMARY OF THE INVENTION

Figure 1:
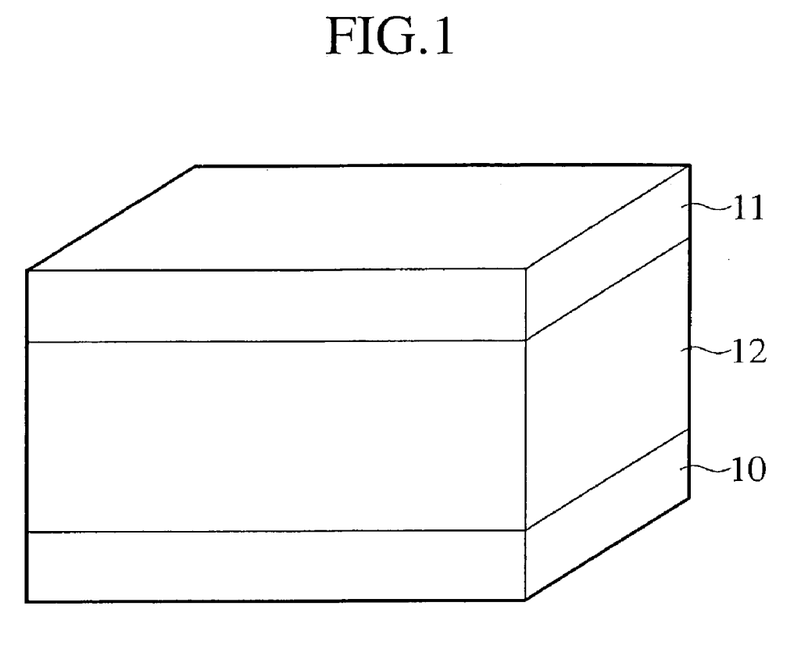
FIG. 1 is a schematic perspective view of a structure of an electrolyte support type unit cell for an SOFC to which studies have been conducted by the present inventors.

Upon extensive studies undertaken by the present inventors, the SOFC has a cell structure like an electrolyte support type cell shown in FIG. 1. With such a cell, electrolyte material powder is sintered at a high density to obtain a dense electrolyte body 12 whose front and rear surfaces are layered with a fuel electrode 10 and an air electrode 11, respectively, by screen printing. Also, with such a cell, the electrolyte body 12 is used as a support member for the fuel electrode, the electrolyte and the air electrode (fuel electrode/electrolyte/air electrode: hereinafter preferably referred to as an electric power generator element).

Figure 2:
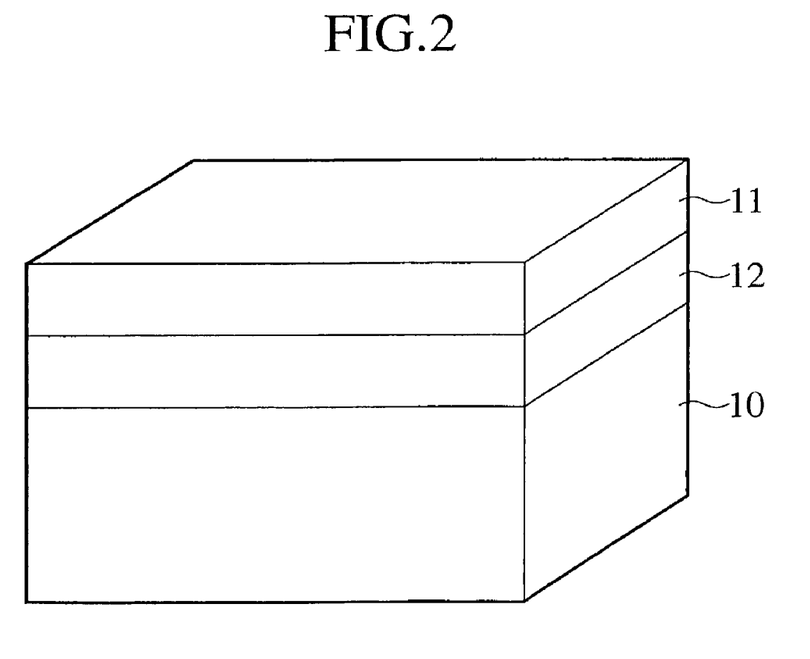
FIG. 2 is a schematic perspective view of a structure of another electrode support type unit cell for an SOFC to which studies have been conducted by the present inventors.

Further, another cell structure is proposed which includes an electrode support type cell as shown in FIG. 2. With such a cell, electrolyte material powder is sintered to obtain a porous electrode body 10 on which an electrolyte layer 12 and an electrode layer 11 are formed by screen printing. Also, with such a cell, the porous electrode body 10 is used as a support member for the electric power generator element.

Figure 3:
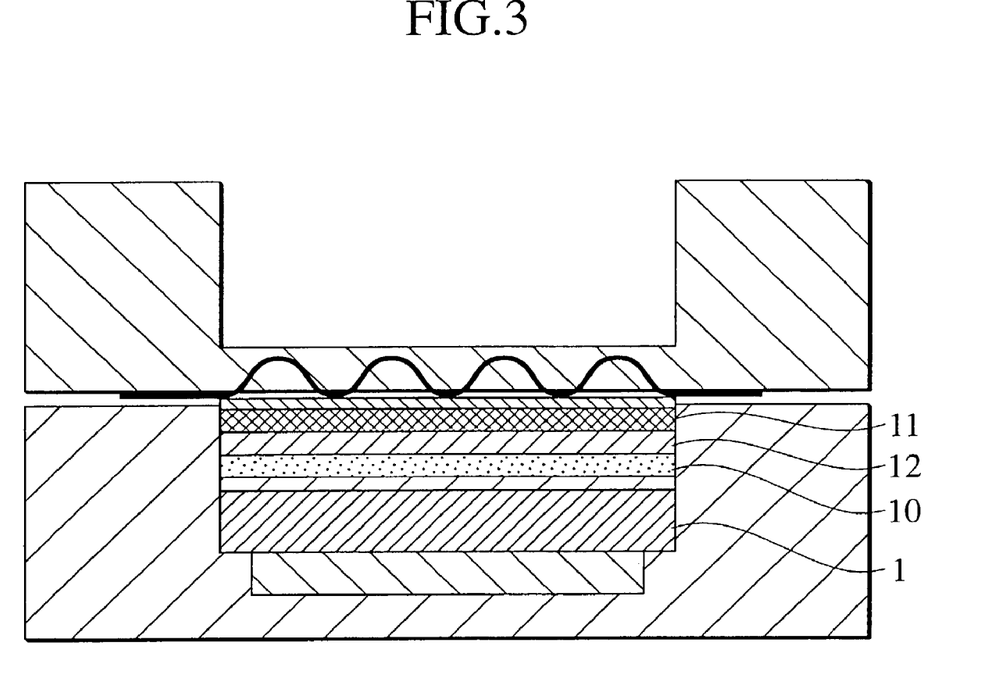
FIG. 3 is a schematic cross sectional view of a structure of a unit cell for an SOFC employing a porous metallic base body to which studies have been conducted by the present inventors.

Furthermore, still another cell structure is proposed which includes a cell shown in FIG. 3 in which the fuel electrode 10, the electrolyte 12, the air electrode 11 are layered on a porous metallic base body 1 in a sequence by thermal spraying to form the support member for the electric power generator element.

However, with the structures in which the electrolyte support type cell shown in FIG. 1 and the electrode support type cell shown in FIG. 2 are supported with the porous metallic base body 1 like the cell shown in FIG. 3, i.e., with the structure in which the electric power generator element (fuel electrode 10/electrolyte 12/air electrode 11) is supported with the porous metallic base body 1, the electric power generator element and the porous metallic base body 1 have thermal deformation rates different from one another, and therefore, it is conceivable that there are tendencies such that minute cracking is caused in the electric power generator element or the electric power generator element is peeled off from the porous metallic base body 1.

The present invention has been completed with the above view in mind and has an object to provide a unit cell for a solid electrolyte type fuel cell, which has an electric power generator element (fuel electrode/electrolyte/air electrode) enabled to be reliably supported with a porous metallic base body without an adverse affect given thereto, and its related manufacturing method.

That is, as a result of considerable diligent studies conducted by the inventors, it was found that the use of the porous metallic base body having a flexibility to serve as a support base body of the electric power generator element effectively enables solution of various issues, and then the present invention has come to be completed.

In accordance with a unit cell for a solid electrolyte type fuel cell of the present invention, the unit cell for the solid electrolyte type fuel cell comprises: a fuel electrode; an air electrode making a pair with the fuel electrode; a solid electrolyte interposed between the fuel electrode and the air electrode; a porous metallic base body disposed on at lease one of a surface of the fuel electrode on the far side from the solid electrolyte and a surface of the air electrode on the far side from the solid electrolyte such that the fuel electrode, the electrolyte, the air electrode and the porous metallic base body are laminated in a laminating direction; and a plurality of concave portions formed in the porous metallic base body so as to extend, in the laminating direction, from a surface of the porous metallic base body.

Stated another way, a unit cell for a solid electrolyte type fuel cell of the present invention, comprises: a fuel electrode; an air electrode making a pair with the fuel electrode; a solid electrolyte interposed between the fuel electrode and the air electrode; a porous metallic base body disposed on at lease one of a surface of the fuel electrode on the far side from the solid electrolyte and a surface of the air electrode on the far side from the solid electrolyte such that the fuel electrode, the electrolyte, the air electrode and the porous metallic base body are laminated in a laminating direction; and means for providing flexibility to the porous metallic base body, the means being formed in the porous metallic base body.

On the other hand, a method of manufacturing a unit cell for a solid electrolyte type fuel cell of the present invention, comprises: preparing a porous metallic base body having a plurality of concave portions; forming associated one of a fuel electrode and an air electrode on the porous metallic base body; forming a solid electrolyte on the associated one of the fuel electrode and the air electrode; and forming remaining one of the fuel electrode and the air electrode on the solid electrolyte.

Other and further features, advantages, and benefits of the present invention will become more apparent from the following description taken in conjunction with the following drawings.

BRIEF DESCRIPTION OF THE DRAWINGS

FIGS. 5 A to 5C are cross sectional views sequentially illustrating a manufacturing method for the unit cell for the SOFC of Example 1 of the embodiment according to the present invention;

DETAILED DESCRIPTION OF THE PREFERRED EMBODIMENT

Before specifically entering into a detailed description of each unit cell for an SOFC and its related manufacturing method of various Examples according to the present invention, a brief description is given first to a unit cell for an SOFC and its related manufacturing method of an embodiment according to the present invention suitably with reference to the accompanying drawings. Although, in the following description of the unit cell and the related manufacturing method described herein, expressions inclusive of directional or positional terms, such as "front surface" or "upper surface" descriptive of one surface of a base body or that of each of electrodes, and "rear surface" or "lower surface" descriptive of the other surface of the base body or that of each of the electrodes, are used for convenience in referring to the accompanying drawings, it is to be understood that these components are equivalent to one another and structures in which these components are mutually replaced are also equivalent to one another, without departing from the principles of the present invention.

As typically shown in FIG. 6, the unit cell for the SOFC of the presently filed embodiment (hereinafter preferably abbreviated to as "unit cell") is comprised of a fuel electrode 10, an air electrode 11 and a solid electrolyte 12 interposed between the fuel electrode 10 and the air electrode 11 to provide a sandwiched body, serving as an electric power generator element, whose front surface and/or rear surface are selectively placed with porous metallic base bodies 1, 100, respectively. For example, structures may involve a unit cell (with a structure layered with porous metallic base body/fuel electrode/solid electrolyte/air electrode, or with a structure layered with porous metallic base body/air electrode/solid electrolyte/fuel electrode, respectively in sequence) in which either one of the porous metallic base body 1 and the porous metallic base body 100 is placed on only one surface of such a sandwiched body, and a unit cell (with a structure layered with porous metallic base body/fuel electrode/solid electrolyte/air electrode/porous metallic base body, or with a structure layered with porous metallic base body/air electrode/solid electrolyte/fuel electrode/porous metallic base body, respectively in sequence) in which the porous metallic base body 1 and the porous metallic base body 100 are correspondingly placed on both surfaces of the sandwiched body. In case of forming a stack using the unit cells each having a structure with the porous metallic base body being disposed on the one surface of the sandwiched body, it is to be noted that the stack has a structure with the respective sandwiched bodies being sandwiched between the porous metallic base bodies appeared on both sides of the sandwiched body. Also, it is to be understood that principles of the above structures may be similarly applied to unit cells shown in FIGS. 7 to 11.

Here, the porous metallic base body may be suitably formed of a sintered metallic body, a foamed metallic body or a metallic fiber nonwoven fabric. Such a porous metallic base body even has a function of a gas flow passage.

Figure 6:
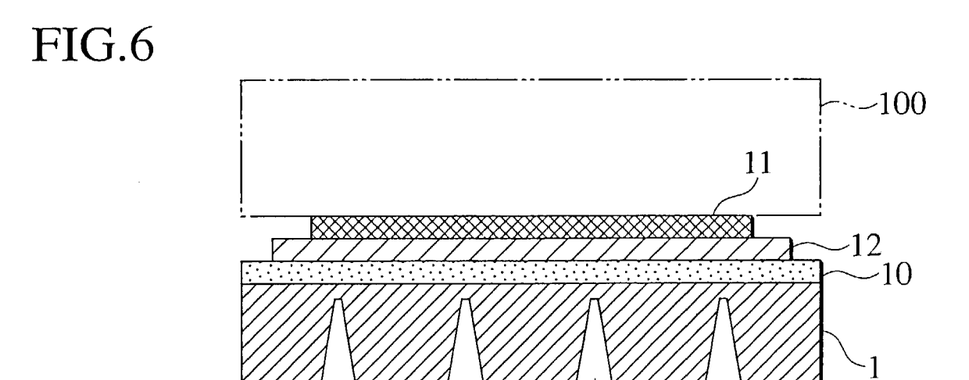
FIG. 6 is a is a cross sectional view illustrating the unit cell for the SOFC of Example 1 of the embodiment according to the present invention.

By the way, with the unit cell of the presently filed embodiment typically shown in FIG. 6, the porous metallic base body 1 is formed with a plurality of concave portions 1A, which extend in a direction in which the respective component parts are laminated, i.e., a laminating direction, from the surface of the porous metallic base body 1 into the porous metallic base body 1 to provide a flexible capability thereto. Such a structure also reliably avoids a probability for the electric power generator element from being cracked or from being peeled from the porous metallic base body and, in addition thereto, warping or swelling of the porous metallic base body is minimized, thereby resulting in a capability of providing the electric power generator element with a thinned plate structure and a thinned film structure.

Figure 7:
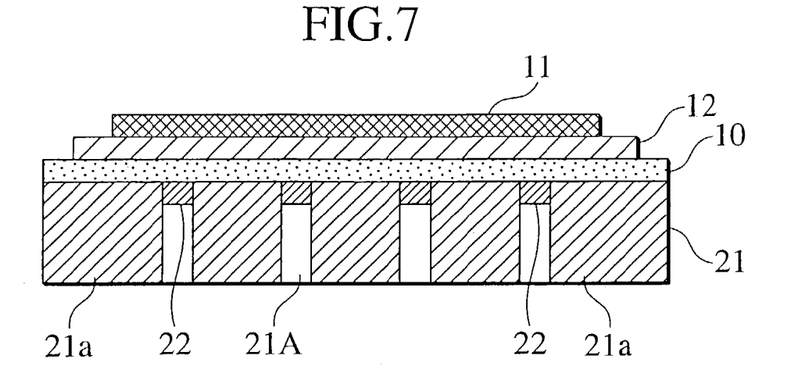
FIG. 7 is a cross sectional view illustrating a unit cell for an SOFC of Example 2 of the embodiment according to the present invention.

Further, when forming the plurality of concave portions in the porous metallic base body of such a unit cell, not only by simply cutting the porous metallic base body in a mechanical process but also by mutually joining a plurality of porous metallic small pieces 21*a* with respect to one another by means of intervened metallic sheets 22, such as metal foils having electric conductivity, the porous metallic base body 21 having the plurality of concave portions 21A may be formed as shown in FIG. 7. More particularly, joining the plural porous metallic small pieces 21*a* with respect to one another by means of soldering or welding allows the porous metallic base body 21 to be formed with mating portions between adjacent porous metallic small pieces 21*a* for forming the plurality of concave portions 21A.

Figure 8:
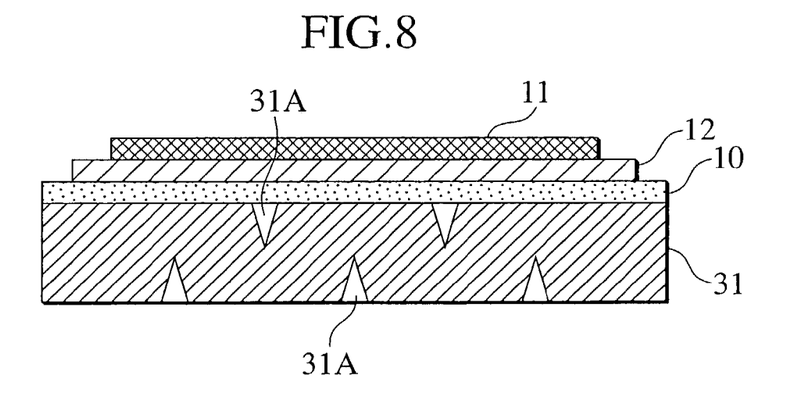
FIG. 8 is a cross sectional view illustrating a unit cell for an SOFC of Example 3 of the embodiment according to the present invention.

Furthermore, while the location at which the plurality of concave portions are provided in the porous metallic base body is basically selected to be one surface of the porous metallic base body on the far side from the sandwiched body as typically shown in FIG. 6, another plurality of concave portions 31A may be additionally formed on the other surface facing the sandwiched body in a manner as shown in FIG. 8. In such a structure, the plurality of concave portions 31A may be preferably formed on the both surfaces of the porous metallic base body 31 in a particular arrangement pattern such that each of the plurality of concave portions 31A formed on one surface of the porous metallic base body 31 is correspondingly arranged in areas between the plurality of concave portions 31A adjacently formed on the other surface of the porous metallic base body 31 as shown in FIG. 8. In a case where the plurality of concave portions 31A are formed on the both surfaces of the porous metallic base body 31 in the particular arrangement pattern set forth above, even when the porous metallic base body 31 undergoes expansion and contraction, it is possible to further alleviate thermal stress to be exerted to the electric power generator element.

Figure 4A:
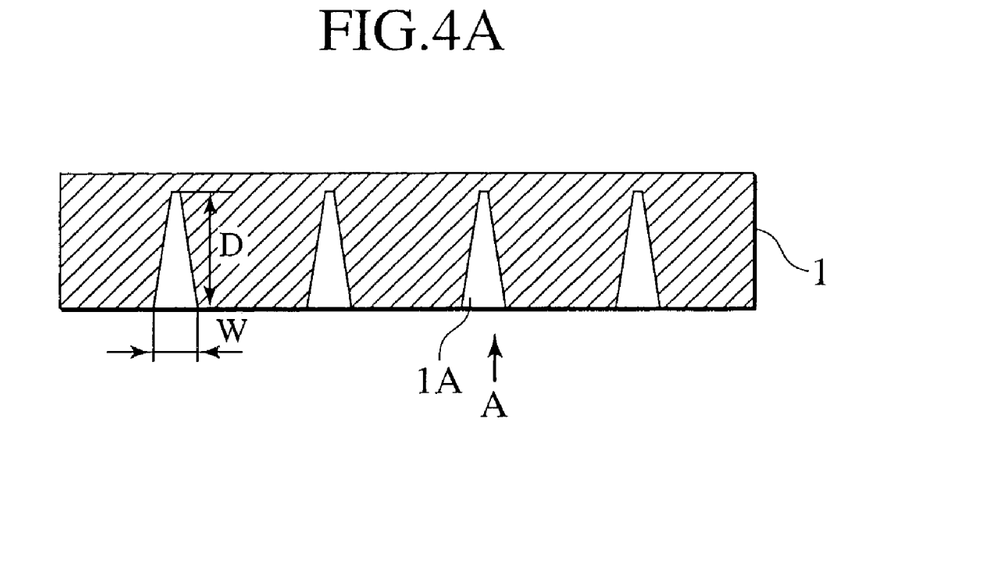
FIG. 4A is a cross sectional view illustrating a structure of a porous metallic base body of a unit cell for an SOFC of Example 1 of an embodiment according to the present invention.
Figure 4B:
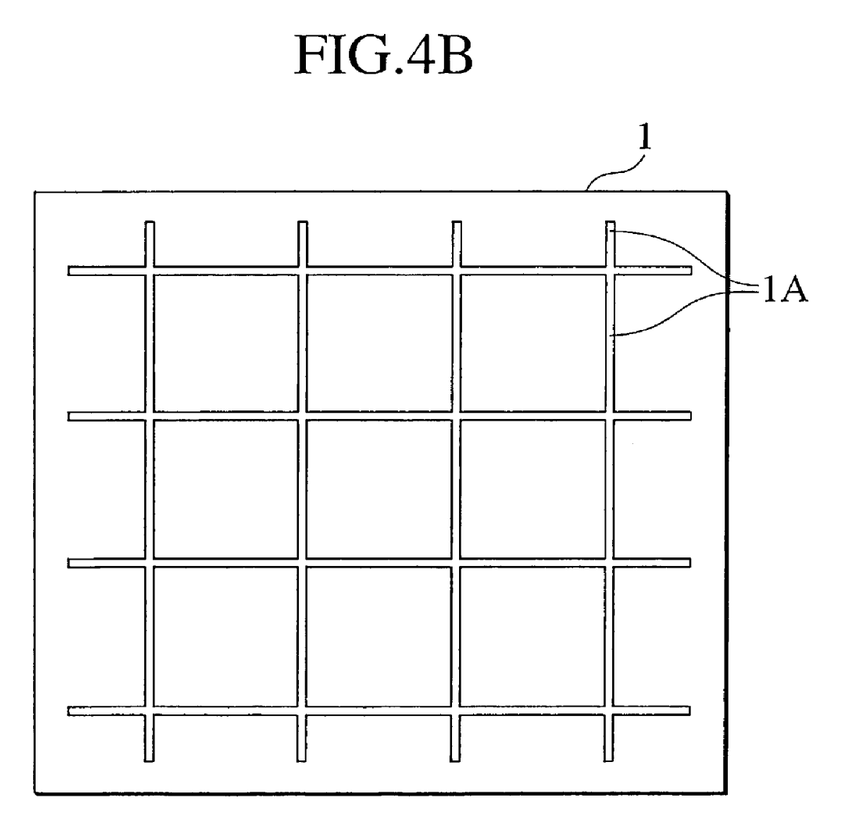
FIG. 4B is a bottom view of the porous metallic base body as viewed in a direction as shown by an arrow A in FIG. 4A.

Moreover, it is preferable for the plurality of concave portions to mutually communicate with one another and, to this end, with the structure typically shown in FIG. 4B, the porous metallic base body 1 has a lattice arrangement pattern which includes the plurality of concave portions 1A extending parallel to one another and the plurality of concave portions 1A extending perpendicular to such concave portions extending parallel to one another. Thus, arranging the plurality of concave portions to mutually communicate with one another enables the porous metallic base body to be entirely provided with flexibility. In consideration of strength of the porous metallic base body, it is preferable for the plurality of concave portions not to be formed at peripheral areas of the surfaces of the porous metallic base body.

In addition, as representatively shown in FIG. 4A, each of the concave portions 1A of the porous metallic base body 1 may preferably have a depth D (an extending depth in a direction in which the component parts are laminated) of a value equal to or above 50% and equal to or less than 80% of a thickness of the porous metallic base body 1 with a view to compelling the porous metallic base body 1 to realize flexibility while maintaining a desired strength. Also, each of the concave portions 1A of the porous metallic base body 1 may preferably have a width W of a value equal to or above 0.05 mm and equal to or less than 2 mm in consideration of the above view points and another factor in which the thickness of the porous metallic base body 1 generally ranges in an order of mm.

Figure 9:
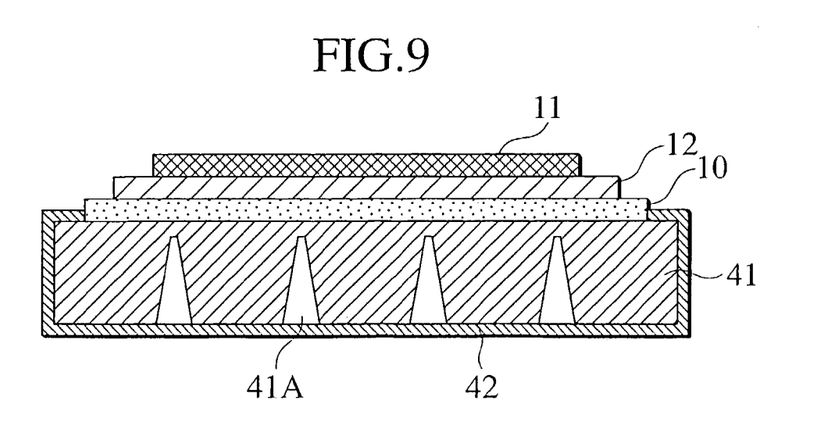
FIG. 9 is a cross sectional view illustrating a unit cell for an SOFC of Example 4 of the embodiment according to the present invention.

Further, as shown in FIG. 9, the unit cell of the presently filed embodiment may have a gas seal member 42 covering the porous metallic base body 41 having the plurality of concave portions 41A at an area except for the sandwiched body including the fuel electrode 10, the solid electrolyte 12 and the air electrode 11. With such a structure, the plurality of concave portions 41A formed in the porous metallic base body 41 are surely enabled to be utilized as gas flow passages, respectively, thereby contributing miniaturization of the stack.

In the meantime, since it is hard for the porous metallic base plate to be formed in an excessively porous state in view of supporting the electric power generator element, it is conceivable that the use of the pores of the porous metallic base body as the gas flow passages to supply gases to the electric power generator element in a long distance tends to increase permeable resistance.

Figure 10:
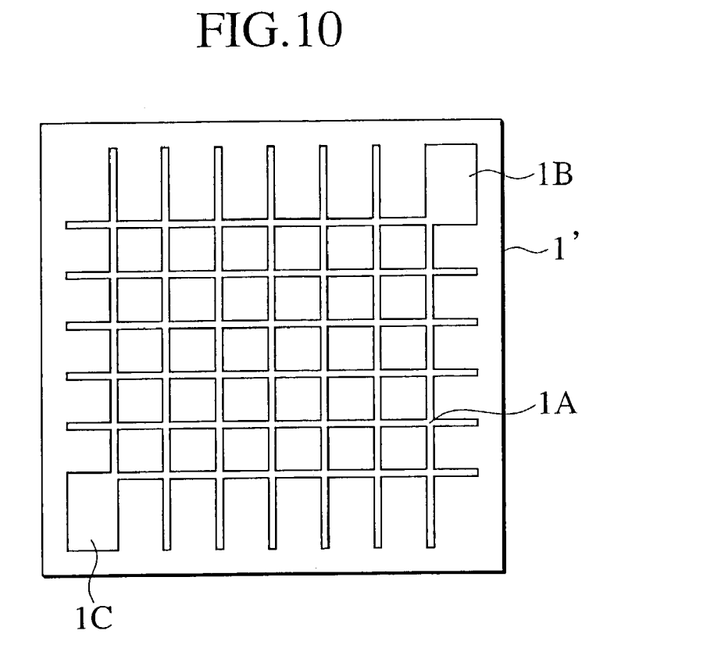
FIG. 10 is a bottom view, which corresponds to FIG. 5, of another example of a porous metallic base body of the embodiment according to the present invention.
Figure 11:
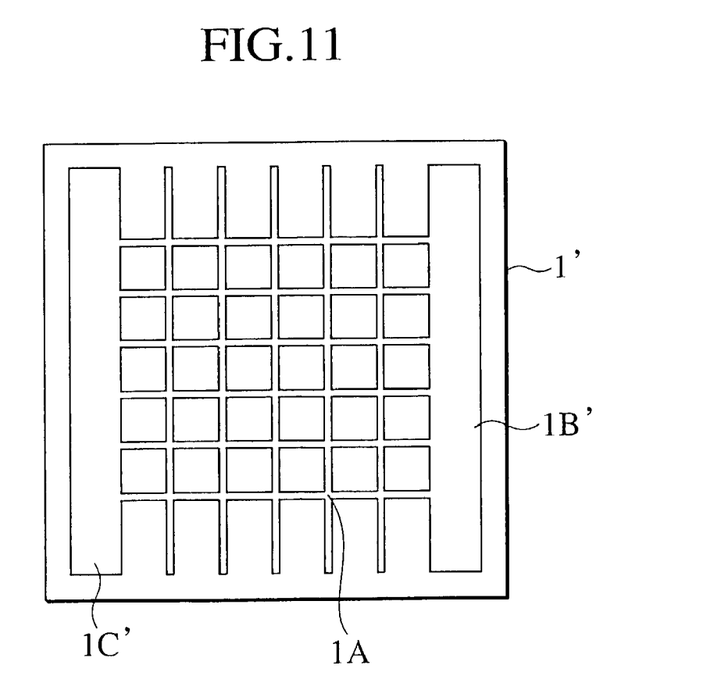
FIG. 11 is a bottom view, which corresponds to FIG. 5, of a still another example of a porous metallic base body of the embodiment according to the present invention.

To address such a provability, as shown in FIGS. 10 and 11, the porous metallic base plates 1', 1' are formed with gas introduction chambers 1B, 1B' and gas discharge chambers 1C, 1C', respectively, to enable both of these chambers to communicate with one another via the plurality of concave portions 1A, 1A to permit the plurality of concave portions 1A, 1A to serve as the gas flow passages with reduced permeable resistances. In a unit cell of another preferred structure, the porous metallic base bodies may be disposed on both the front and rear surfaces of the sandwiched body, respectively, with each porous metallic base body having the gas introduction chamber and the gas discharge chamber which are held in communication with one another via the plurality of concave portions so as to cause one porous metallic base body to permeate the oxidizing gas to the air electrode while permitting the other porous metallic base body to permeate the fuel gas to the fuel electrode.

Owing to the porous metallic base body and associated reinforcing members, such as the metallic sheets for joining, for use in the SOFC being exposed to reducing gas or oxidizing gas under a high temperature, the component elements of the unit cell are required to have an adequate anti-reducing property, anti-oxidizing property and anti-sulfatizing property under the high temperature. In consideration of such properties, the porous metallic base body may be preferably made of nickel (Ni), nickel chrome (Ni—Cr), nickel chrome iron (Ni—Cr—Fe), nickel chrome tungsten molybdenum (Ni—Cr—W—Mo), nickel cobalt (Ni—Co), nickel copper (Ni—Cu), silver (Ag), silver palladium (Ag—Pr), silver platinum (Ag—Pt), iron chrome nickel (Fe—Cr—Ni), iron chrome aluminum (Fe—Cr—Al), or an alloy involving any arbitrary combination of these materials. Further, the porous metallic base body may be plated with at least one metal selected from the group consisting of platinum, nickel, platinum palladium and copper, and carrying out the plating treatment provides an improvement over the anti-oxidizing property and electrical characteristics.

Further, the solid oxide electrolyte of the electric power generator element of the unit cell may be suitably formed of yttrium stabilized zirconia (YSZ), ceria series material and lanthanum gallate series material. The air electrode may be formed of lanthanum-strontium-manganese oxide (LSM), lanthanum-strontium-cobalt oxide (LSC), silver (Ag) and platinum (Pt), and the fuel electrode may be suitably formed of nickel (Ni) and nickel cermet (Ni cermet).

Of course, the present invention is not limited to the number of and the particular arrangement pattern of the concave portions of the porous metallic base body set forth above, and these factors may be suitably selected to have a desired value and a desired pattern, provided that a desired strength of the porous metallic base body is realized with the sufficient flexibility.

Now, various Examples of the presently filed embodiment are described below in detail with suitable reference to the accompanying drawings, in conjunction with Comparative Examples for convenience.

EXAMPLE 1

First, a unit cell for an SOFC of Example 1 of the presently filed embodiment and its related manufacturing method are described below in detail with suitable reference to FIGS. 4A to 6.

Figure 5A:
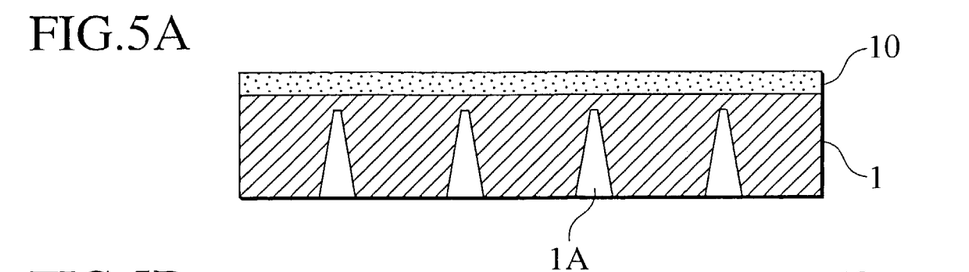
Figure 5B:
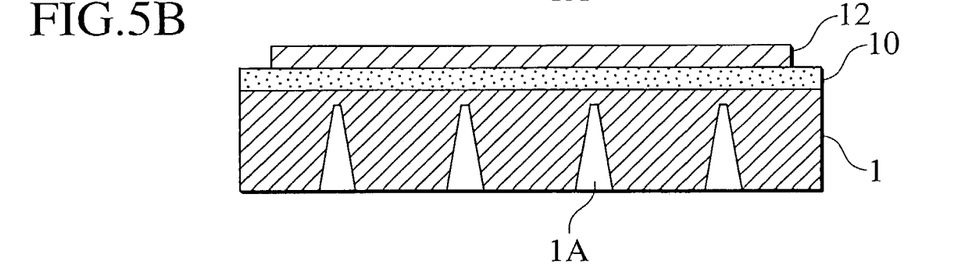
Figure 5C:
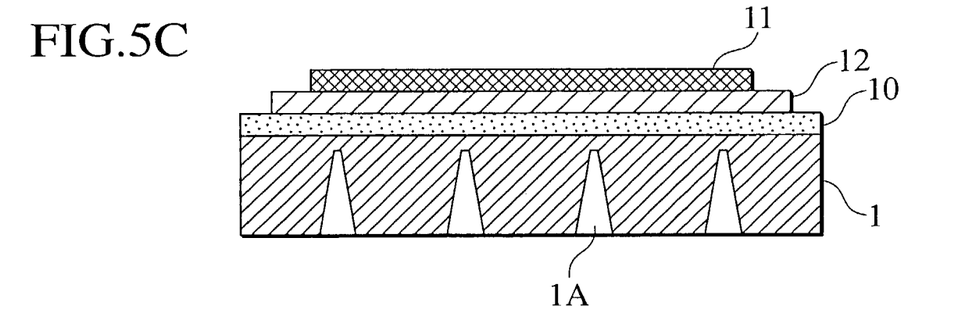

FIG. 4A is a cross sectional view illustrating the structure of the porous metallic base body of the unit cell for the SOFC of the present Example, and FIG. 4B is a bottom view of the porous metallic base body when viewed from the bottom in a direction as shown by an arrow A. FIGS. 5A to 5C show cross sectional views illustrating the manufacturing method of the unit cell for the SOFC of the present Example, and FIG. 6 is a cross sectional view illustrating the structure of the unit cell for the SOFC of the present Example.

As shown in FIGS. 4A and 4B, initially, a foamed metallic base body made of inconel alloy with a thickness of approximately 2 mm and a porosity of approximately 90% was prepared, and the one surface (rear surface), opposite to the other surface on which the electric power generator element were disposed, of the porous metallic base body was cut by a mechanical machining process to form wedge-like grooves (concave portions) 1A each of which has a width W of approximately 1 mm and a depth D of approximately 1.5 mm in a lattice pattern with a distance of approximately 5 mm between the adjacent wedge-like grooves for thereby obtaining the porous metallic base body 1.

Subsequently, as shown in FIG. 5A, the porous metallic base body 1 was formed with a layer of the fuel electrode 10, composed of Ni—YSZ, so as to have a thickness of approximately 30 μm, using a screen printing method.

Next, as shown in FIG. 5B, a layer of the solid electrolyte 12, composed of YSZ, with a thickness of approximately 30 μm was formed over the fuel electrode 10, layered over the porous metallic base body 1, using the screen printing method.

And, as shown in FIG. 5C, a layer of the air electrode 11, composed of LSC, with a thickness of approximately 30 μm was formed over the solid electrolyte 12 layered on the fuel electrode 10, using the screen printing method, obtaining the unit cell for the SOFC. It may of course be possible for such a unit cell to be additionally provided with the porous metallic base body 100, with the same structure as that of the porous metallic base body 1, at the front surface of the air electrode 11 in opposition to the porous metallic base body 1 as shown in FIG. 6.

The structure, the detailed configuration, the electric power generator element, results and correlated figures of the resulting unit cell for an SOFC of this Example obtained in the way set forth above are summarized and indicated in Table 1 after-mentioned.

EXAMPLE 2

Next, a unit cell for an SOFC of Example 2 of the presently filed embodiment and its related manufacturing method are described below in detail with suitable reference to FIG. 7. The unit cell of this Example principally has a porous metallic base body that differs from that of Example 1 in structure and, hence, a detailed description is given below with like parts bearing the same reference numerals to omit redundant description.

FIG. 7 is a cross sectional view illustrating the structure of the porous metallic base body of the unit cell for the SOFC of the present Example.

As shown in FIG. 7, a porous metallic base body 21 made of metallic nonwoven fabric, composed of a sheet made of $Fe_{20}Cr_5Al$, with a thickness of approximately 0.5 mm and a porosity of approximately 40% was prepared. Here, the porous metallic base body 21 was obtained by preparing six porous metallic small pieces 21a, each with a square of approximately 10 mm, which were joined by means of ferrite stainless foils 22 such that plural rectangular shape grooves 21A were formed between adjacent porous metallic small pieces 21a to form the plurality of concave portions, respectively.

Subsequently, the unit cell for the SOFC was obtained in the same way as that of Example 1 except that the solid electrolyte 12 was formed over the porous metallic base body 21 by sputtering and the solid electrolyte 12 and the fuel electrode 10 was formed to have a thickness different from those of Example 1.

The structure, the detailed configuration, the electric power generator element, results and correlated figures of the resulting unit cell for an SOFC of this Example obtained in the way set forth above are summarized and indicated in Table 2 after-mentioned.

EXAMPLE 3

Next, a unit cell for an SOFC of Example 3 of the presently filed embodiment and its related manufacturing method are described below in detail with suitable reference to FIG. 8. The unit cell of this Example principally has a porous metallic base body that differs from that of Example 1 in structure and, hence, a detailed description is given below with like parts bearing the same reference numerals to omit redundant description.

FIG. 8 is a cross sectional view illustrating the structure of the porous metallic base body of the unit cell for the SOFC of the present Example.

As shown in FIG. 8, the unit cell for the SOFC was obtained in the same manner as that of Example 1 except that both sides of a porous metallic base body 31 were cut in the machining process to form grooves (concave portions) 31A, 31A, each with a width of approximately 0.5 mm and a depth of approximately 0.5 mm, in a lattice pattern with a distance of approximately 5 mm. Here, the arrangement pattern in which the plurality of concave portions were formed on the both sides of the porous metallic base body 31 was selected such that the concave portions of one group formed on one surface of the porous metallic base body 31 were correspondingly arranged in the areas between the adjacent concave portions among the concave portions of another group formed on the other surface of the porous metallic base body 31.

The structure, the detailed configuration, the electric power generator element, results and correlated figures of the resulting unit cell for an SOFC of this Example obtained in the way set forth above are summarized and indicated in Table 3 after-mentioned.

EXAMPLE 4

Next, a unit cell for an SOFC of Example 4 of the presently filed embodiment and its related manufacturing method are described below in detail with suitable reference to FIG. 9. The unit cell of this Example is principally different from that of Example 1 in that a porous metallic base body 41 is covered with a gas shield member 42 and, hence, a detailed description is given below with like parts bearing the same reference numerals to omit redundant description.

FIG. 9 is a cross sectional view illustrating the structure of the porous metallic base body of the unit cell for the SOFC of the present Example.

As shown in FIG. 9, the unit cell for the SOFC was obtained in the same manner as that of Example 1 except that the gas shield material 42 composed of a ferrite stainless foil is covered over the surface of the porous metallic base body 41, with the same structure obtained in Example 1, at an area except for the surface on which the electric power generator element including the fuel electrode 10, the air electrode 11 and the solid electrolyte 12 interposed between the fuel electrode 10 and the air electrode 11 is disposed.

The structure, the detailed configuration, the electric power generator element, results and correlated figures of the resulting unit cell for an SOFC of this Example obtained in the way set forth above are summarized and indicated in Table 4 after-mentioned.

Also, with the foregoing Examples, as shown in FIGS. 10 and 11, the unit cells for the SOFCs may be structured each of which has the porous metallic base body 1' formed with the gas introduction chamber 1B (1B') for introducing gas into the relevant electrode (closer to the electric power generator element) adjacent to the porous metallic base body 1' via the grooves (concave portions) 1A and the gas discharge chamber 1C (1C') in communication with the concave portions 1A to allow the gas to be discharged. It may of course be possible for such a structure to have the porous metallic base body 1' that includes the gas introduction chamber 1B (1B') and the gas discharge chamber 1C (1C') located on both sides of the electric power generation element to permit the oxidizing gas, such as air, to be permeated to the air electrode while permitting the fuel gas, such as methane, to be permeated to the fuel electrode, respectively.

Comparative Example 1

In this Comparative Example, a unit cell for an SOFC was similarly manufactured except for the porous metallic base body with no concave portions.

Figure 12:
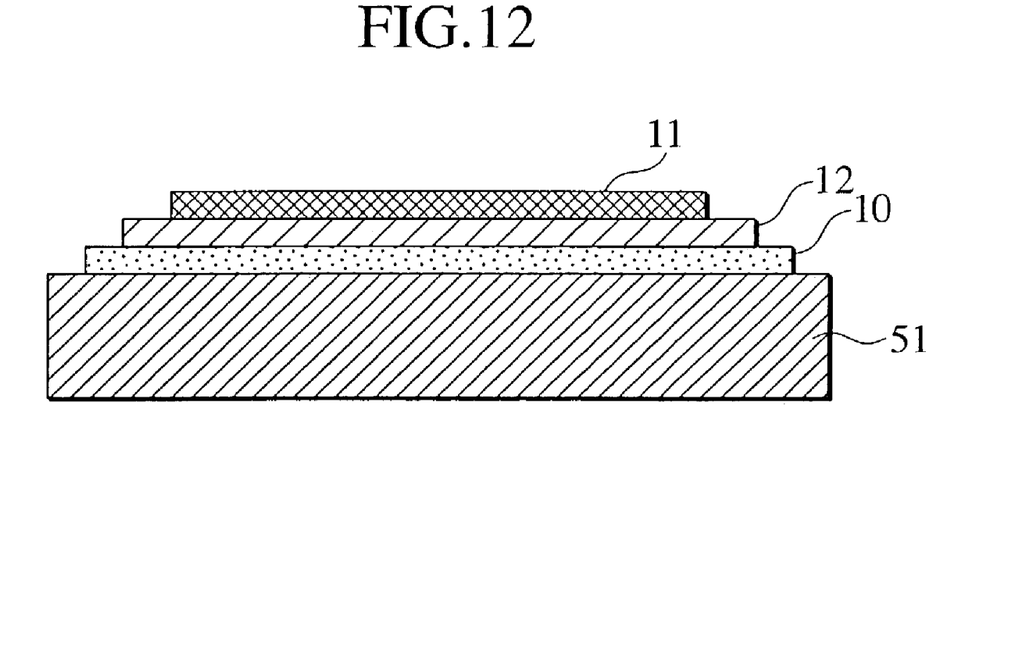
FIG. 12 is a cross sectional view illustrating a structure of a unit cell for an SOFC of Comparative Example 1 described in conjunction with Examples of the embodiment according to the present invention.

That is, as shown in FIG. 12, the unit cell for the SOFC was obtained by covering an electrode (Ni—YSZ) 10, a solid electrolyte (YSZ) 12 and an electrode (LSC) 11, each with a thickness of approximately 30 μm, over a porous metallic base body 51, made of inconel alloy in foamed metal with a thickness of approximately 2 mm and a porosity of approximately 90%, in sequence by a screen printing method.

The structure, the detailed configuration, the electric power generator element, results and correlated figures of the resulting unit cell for an SOFC of this Comparative Example obtained in the way set forth above are summarized and indicated in Table 5 after-mentioned.

Comparative Example 2

In this Comparative Example, a unit cell for an SOFC was similarly manufactured except for a gas shield member being located in the structure of the Comparative Example 1.

Figure 13:
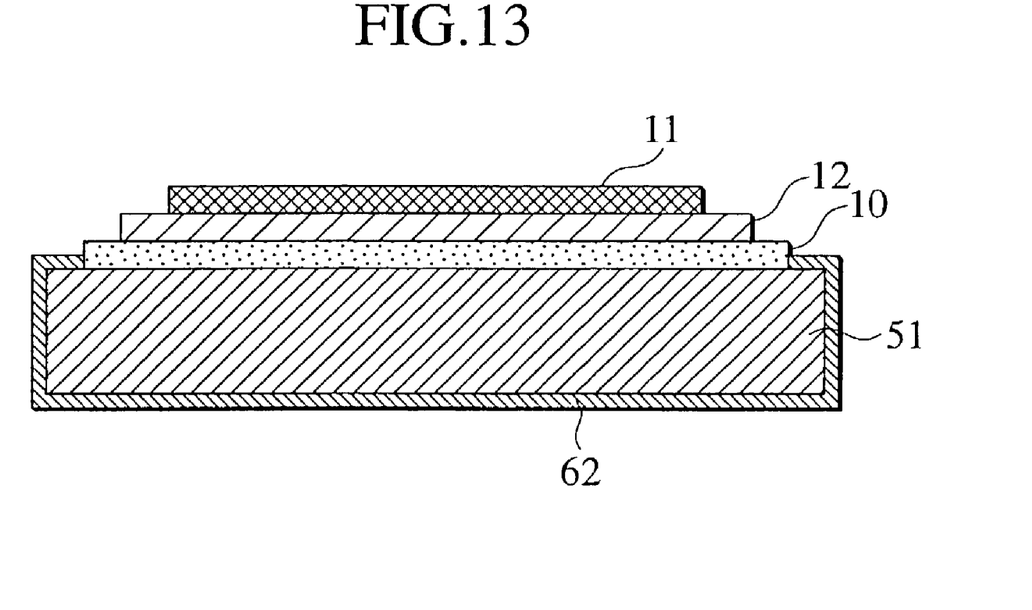
FIG. 13 is a cross sectional view illustrating a structure of a unit cell for an SOFC of Comparative Example 2 described in conjunction with Examples of the embodiment according to the present invention.

That is, as shown in FIG. 13, the unit cell for the SOFC was obtained to have the same structure as that of the Comparative Example 1 except in that the porous metallic base body 51 is covered at its surface except for the electric power generator element with the gas shield member (ferrite stainless foil) 62.

The structure, the detailed configuration, the electric power generator element, results and correlated figure of the resulting unit cell for an SOFC of this Comparative Example obtained in the way set forth above are summarized and indicated in Table 6 after-mentioned.

TABLE 1

| | | |
|---|---|---|
| | Structure | The porous metallic base body was preliminarily and mechanically cut to form the concave portions and the electric power generator element were formed in the printing process. |
| | Detailed Configuration | Concave portions located on rear surface of electric power generator element. Width: approximately 1 mm Depth: approximately 1.5 mm Lattice pattern with distance of approximately 5 mm |
| | Porous Metallic Base Body | Foamed metal Inconel alloy Thickness of approximately 2 mm Porosity of approximately 90% |
| Electric Power Generator Element | Electrode (Fuel Electrode) | Made of Ni-YSZ Thickness of approximately 30 μm Film formed by printing |
| | Electrolyte | Made of YSZ Thickness of approximately 30 μm Film formed by printing |
| | Electrode (Air Electrode) | Made of LSC Thickness of approximately 30 μm Film formed by printing |
| | Results | No warping caused in base body Favorable printing property provided for electric power generator element No cracking or peeling caused on electric power generator element No warping, cracking and peeling caused under 800° C.*1000 h condition |
| | Correlated Figures | FIGS. 4A to 6 |

TABLE 2

| | | |
|---|---|---|
| | Structure | Plural porous metallic small pieces are connected via metal foils with mating portions defining concave portions. |
| | Detailed Configuration | Metallic base body composed of joined porous metallic small pieces by use of metal sheets Sixteen pieces each with a square of approximately 10 mm Thickness of approximately 50 μm Joined with ferrite stainless foils Thickness of approximately 30 μm Mating portions defined concave portions Width of approximately 2 mm Lattice pattern with a distance of approximately 0.5 mm |
| | Porous Metallic Base Body | Nonwoven metallic fabric Made of Fe$_{20}$Cr$_5$Al Thickness of approximately 0.5 mm Porosity of approximately 40% |
| Electric Power Generator Element | Electrode (Fuel Electrode) | Made of Ni-YSZ Thickness of approximately 50 μm Film formed by printing |
| | Electrolyte | Made of YSZ Thickness of approximately 10 μm Film formed by sputtering |

TABLE 2-continued

| | |
|---|---|
| Electrode (Air Electrode) | Made of LSC<br>Thickness of approximately 30 μm<br>Film formed by printing |
| Results | No warping caused in base body<br>Favorable printing property provided for electric power generator element<br>No cracking or peeling caused on electric power generator element<br>No warping, cracking and peeling caused under 800° C.*1000 h condition |
| Correlated Figure | FIG. 7 |

TABLE 3

| | | |
|---|---|---|
| Structure | | Both surfaces of porous metallic base body were preliminarily formed with concave portions by a machining process, and electric power generator element were formed by a printing method. |
| Detailed Configuration | | Concave portions located on both surfaces of base plate<br>Width of approximately 0.5 mm<br>Depth of approximately 0.5 mm<br>Lattice pattern with a distance of approximately 5 mm |
| Porous Metallic Base Body | | Foamed metal<br>Made of inconel alloy<br>Thickness of approximately 2 mm<br>Porosity of approximately 90% |
| Electric Power Generator Element | Electrode (Fuel Electrode) | Made of Ni-YSZ<br>Thickness of approximately 30 μm<br>Film formed by printing |
| | Electrolyte | Made of YSZ<br>Thickness of approximately 30 μm<br>Film formed by printing |
| | Electrode (Air Electrode) | Made of LSC<br>Thickness of approximately 30 μm<br>Film formed by printing |
| Results | | No warping caused in base body<br>Favorable printing property provided for electric power generation element<br>No cracking or peeling caused on electric power generator element<br>No warping, cracking and peeling caused under 800° C.*1000 h condition |
| Correlated Figure | | FIG. 8 |

TABLE 4

| | | |
|---|---|---|
| Structure | | Porous metallic base body was preliminarily formed with concave portions by a machining process, and gas shield material was covered over the porous metallic base body at area except for the surface on which electric power generator element is disposed to form the electric power generator element by printing. |
| Detailed Configuration | | Concave portions located on rear surface of base plate<br>Width of approximately 1 mm<br>Depth of approximately 1.5 mm<br>Lattice pattern with a distance of approximately 5 mm<br>Gas shield material<br>Made of ferrite stainless foil<br>Thickness of approximately 30 μm |
| Porous Metallic Base Body | | Foamed metal<br>Made of inconel alloy<br>Thickness of approximately 2 mm<br>Porosity of approximately 90% |
| Electric Power Generator Element | Electrode (Fuel Electrode) | Made of Ni-YSZ<br>Thickness of approximately 30 μm<br>Film formed by printing |

TABLE 4-continued

| | | |
|---|---|---|
| Element | Electrolyte | Made of YSZ<br>Thickness of approximately 30 μm<br>Film formed by printing |
| | Electrode (Air Electrode) | Made of LSC<br>Thickness of approximately 30 μm<br>Film formed by printing |
| Results | | No warping caused in base body<br>Favorable printing property provided for electric power generation element<br>No cracking or peeling caused on electric power generator element<br>No warping, cracking and peeling caused under 800° C.*1000 h condition<br>No leakage of gas |
| Correlated Figure | | FIG. 9 |

TABLE 5

| | | |
|---|---|---|
| Structure | | Porous metallic base body with no concave portions was used. |
| Detailed Configuration | | With no concave portions. |
| Porous Metallic Base Body | | Foamed metal<br>Made of inconel alloy<br>Thickness of approximately 2 mm<br>Porosity of approximately 90% |
| Electric Power Generator Element | Electrode (Fuel Electrode) | Made of Ni-YSZ<br>Thickness of approximately 30 μm<br>Film formed by printing |
| | Electrolyte | Made of YSZ<br>Thickness of approximately 30 μm<br>Film formed by printing |
| | Electrode (Air Electrode) | Made of LSC<br>Thickness of approximately 30 μm<br>Film formed by printing |
| Results | | Warping caused in base body<br>Unfavorable printing property provided for electric power generator element<br>Cracking or peeling caused on electric power generator element<br>Warping, cracking and peeling occurred under 800° C.*1000 h condition |
| Correlated Figure | | FIG. 12 |

TABLE 6

| | | |
|---|---|---|
| Structure | | Porous metallic base body with no concave portions was used. |
| Detailed Configuration | | With no concave portions |
| Porous Metallic Base Body | | Foamed metal<br>Made of inconel alloy<br>Thickness of approximately 2 mm<br>Porosity of approximately 90% |
| Electric Power Generator Element | Electrode (Fuel Electrode) | Made of Ni-YSZ<br>Thickness of approximately 30 μm<br>Film formed by printing |
| | Electrolyte | Made of YSZ<br>Thickness of approximately 30 μm<br>Film formed by printing |
| | Electrode (Air Electrode) | Made of LSC<br>Thickness of approximately 30 μm<br>Film formed by printing |
| Results | | In addition to results of Comparative Example 1, large permeable resistance appeared. |
| Correlated Figure | | FIG. 13 |

As will be understood from Tables 1 to 4, with the unit cells for the SOFCs manufactured in the various Examples set forth above, the porous metallic base bodies 1, 21, 31, 41 had respective shapes either of which revealed no warping to exhibit favorable results. Further, the electric power generator elements exhibited favorable printing properties, respectively, with no cracking or peeling phenomenon being induced. Furthermore, even when the unit cells were held at 800° C. for 1000 hours (under the circumstance of 800° C.×1000 h), there were no provability of deformation, such as warping, caused in the porous metallic base bodies 1, 21, 31, 41 and of cracking or peeling caused in the electric power generator elements. In addition, the unit cell for the SOFC manufactured in Example 4 encountered no leakage of gas.

On the contrary, as indicated in Tables 5 and 6, the unit cells for the SOFCs manufactured in the Comparative Examples described above had the porous metallic base bodies 51 encountered with warping. Further, the electric power generator elements encountered the unfavorable printing properties and suffered from cracking or peeling. Also, under the circumstance of 800° C.×1000 h, there were remarkable provability for the porous metallic base bodies 51 to encounter warping and for the electric power generator elements to encounter cracking. In addition, with the unit cell for the SOFC according to the Comparative Example 2, an extremely large degree of permeable resistance were recognized in the porous metallic base body.

Accordingly, with the unit cells for the SOFCs of the Examples, it was able to demonstrate that there were no provability for the electric power generator elements to undergo cracking due to thermal stress and to peal and drop off from the porous metallic base bodies.

As previously noted above from the foregoing description, according to the present invention, the unit cell for the SOFC has the structure in which the porous metallic base body, serving as the support member for the electric power generator element (fuel electrode/electrolyte/air electrode), is formed with the plurality of concave portions, thereby surly a reliable unit cell for an SOFC with no provability for the electric power generator element to encounter cracking and to peel and drop off from the porous metallic base body.

The entire content of a Patent Application No. TOKUGAN 2001-367384 with a filing date of Nov. 30, 2001 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A unit cell for a solid electrolyte type fuel cell, comprising:
   a fuel electrode;
   an air electrode making a pair with the fuel electrode;
   a solid electrolyte interposed between the fuel electrode and the air electrode;
   a porous metallic base body made of porous metallic material and disposed on at least one of a surface of the fuel electrode on the far side from the solid electrolyte and a surface of the air electrode on the far side from the solid electrolyte such that the fuel electrode, the electrolyte, the air electrode and the porous metallic base body are laminated in a laminating direction;
   a plurality of concave portions formed in the porous metallic base body such that within the porous metallic material forming the porous metallic base body, respective concave portions extend, in the laminating direction, from a surface of the porous metallic base body;
   a gas introduction chamber introducing gas to an associated one of the fuel electrode and the air electrode via the plurality of concave portions; and
   a gas discharge chamber permitting the gas introduced in the gas introduction chamber to be discharged,
   wherein the gas introduction chamber and the gas discharge chamber are formed in the porous metallic base body, and the porous metallic base bodies are located on both the surface of the fuel electrode on the far side from the solid electrolyte and the surface of the air electrode on the far side from the solid electrolyte, with the gas introduction chamber of the porous metallic base body located on the surface of the fuel electrode on the far side from the solid electrolyte being supplied with fuel gas while the gas introduction chamber of the porous metallic base body located on the surface of the air electrode on the far side from the solid electrolyte is supplied with oxidizing gas.

2. The unit cell for the solid electrolyte type fuel cell according to claim 1, wherein the porous metallic base body includes a plurality of porous metallic small pieces mutually joined to one another via metallic sheets each of which has an electrical conductivity, with regions between adjacent ones of the plurality of porous metallic small pieces defining the plurality of concave portions, respectively.

3. The unit cell for the solid electrolyte type fuel cell according to claim 1, wherein the porous metallic base body is made of at least one of a sintered metal body, a formed metal body and a nonwoven metal fabric.

4. The unit cell for the solid electrolyte type fuel cell according to claim 1, wherein the porous metallic base body has a pair of surfaces opposed with respect to one another in the laminating direction, and the plurality of concave portions are formed on one surface of the pair of the surfaces of the porous metallic base body, the one surface being on the far side from associated one of the fuel electrode and the air electrode.

5. The unit cell for the solid electrolyte type fuel cell according to claim 4, wherein the plurality of concave portions are further formed on the other surface of the pair of the surfaces of the porous metallic base body, the other surface facing the associated one of the fuel electrode and the air electrode.

6. The unit cell for the solid electrolyte type fuel cell according to claim 5, wherein the plurality of concave portions are formed in an arrangement pattern such that at least one of the plurality of concave portions formed on the one surface of the porous metallic base body is arranged between adjacent ones of the plurality of concave portions formed on the other surface of the porous metallic base body.

7. The unit cell for the solid electrolyte type fuel cell according to claim 1, wherein the plurality of concave portions mutually communicate with one another.

8. The unit cell for the solid electrolyte type fuel cell according to claim 7, wherein the plurality of concave portions are formed on the surface of the porous metallic base body, crossing with one another.

9. The unit cell for the solid electrolyte type fuel cell according to claim 1, further comprising a gas shield member shielding a periphery of the porous metallic base body except for a portion in which associated one of the fuel electrode and the air electrode is located.

10. The unit cell for the solid electrolyte type fuel cell according to claim 1, wherein the porous metallic base body is made of alloy containing at least one metal selected from the group consisting of nickel, nickel chrome, nickel chrome iron, nickel chrome tungsten molybdenum, nickel cobalt, nickel copper, silver, silver palladium, silver platinum, iron chrome nickel and iron chrome aluminum.

11. The unit cell for the solid electrolyte type fuel cell according to claim 1, wherein the porous metallic base body is plated with at least one metal selected from the group consisting of platinum, nickel, platinum palladium and copper.

12. The unit cell for the solid electrolyte type fuel cell according to claim 1, wherein the plurality of concave portions have respective depths ranging in a value of equal to or above 50% and equal to or less than 80% of the thickness of the porous metallic base body and respective widths ranging in a value of equal to or above approximately 0.05 mm and equal to or less than approximately 2 mm.

* * * * *